March 21, 1939.  A. H. POHLMEYER  2,151,150
CLUTCH MECHANISM
Filed Dec. 4, 1937   2 Sheets-Sheet 1
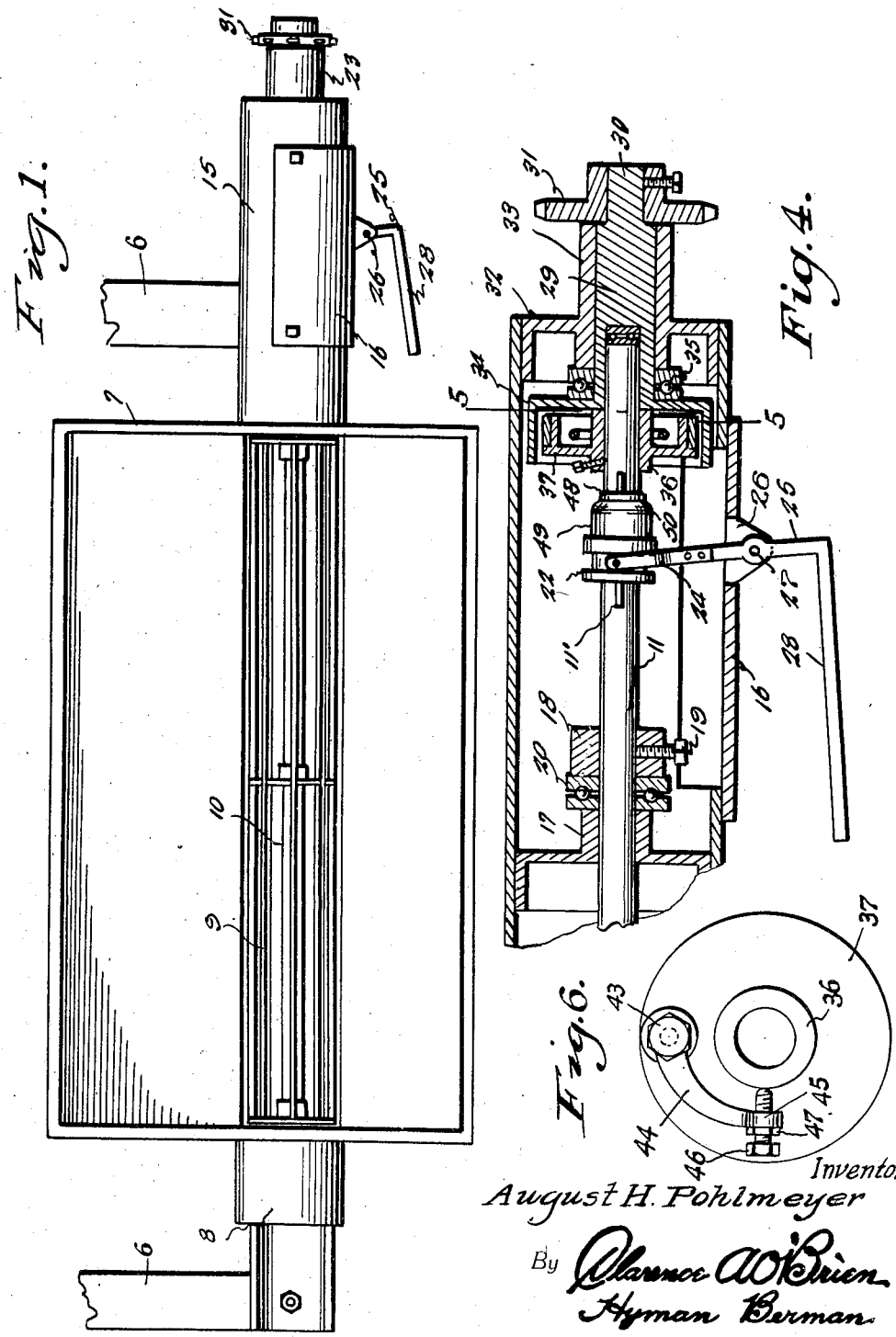
Inventor
August H. Pohlmeyer
By Clarence A. O'Brien
Hyman Berman
Attorneys March 21, 1939.  A. H. POHLMEYER  2,151,150
CLUTCH MECHANISM
Filed Dec. 4, 1937    2 Sheets-Sheet 2
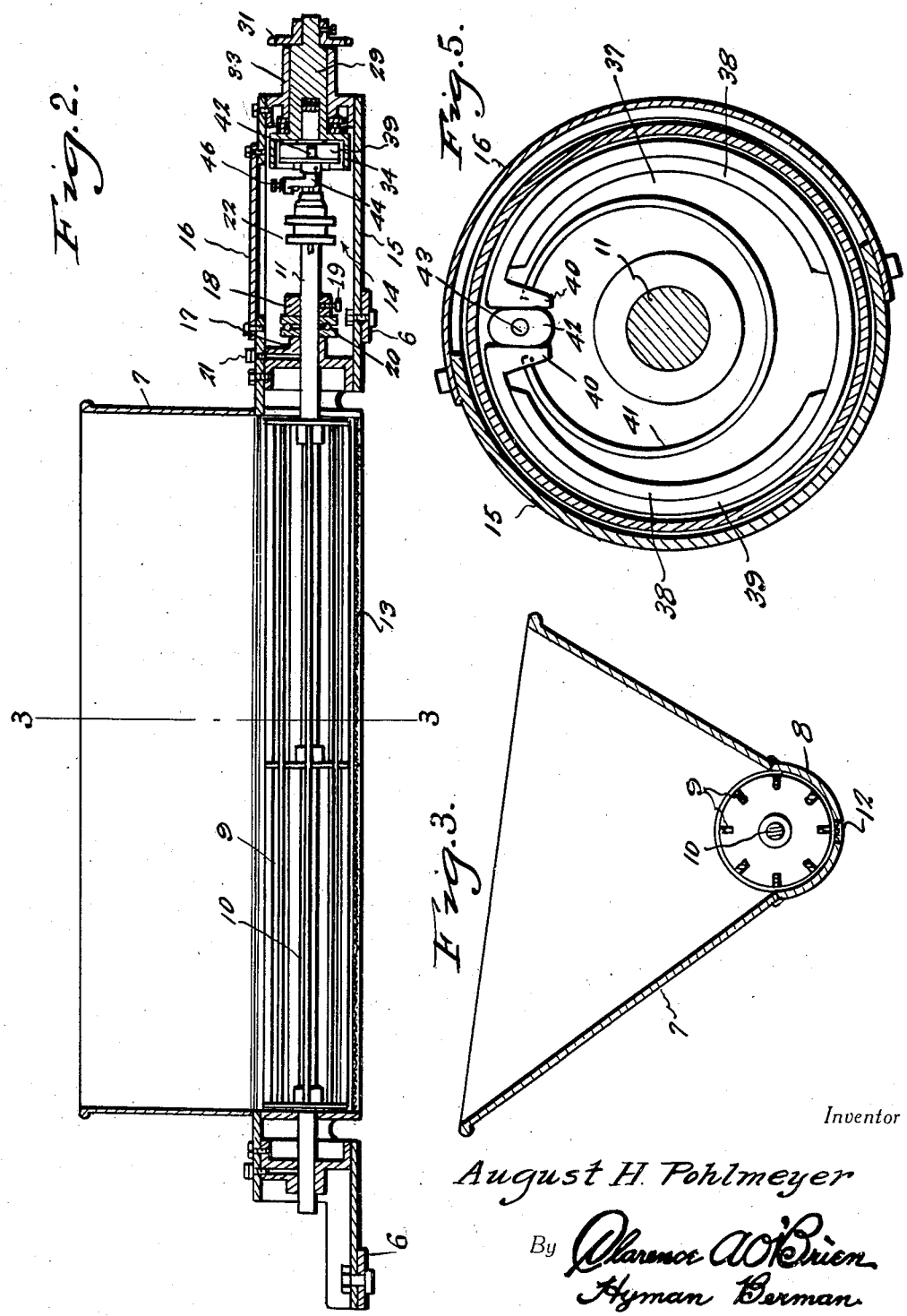
Inventor
August H. Pohlmeyer
By Clarence A. O'Brien
Hyman Berman
Attorneys Patented Mar. 21, 1939

2,151,150

UNITED STATES PATENT OFFICE 2,151,150

CLUTCH MECHANISM

August H. Pohlmeyer, Chincoteague, Va.

Application December 4, 1937, Serial No. 178,157

1 Claim. (Cl. 192—78)

The present invention relates to new and useful improvements in flour sifting means for dough machines, the same being a continuation in part of my co-pending application Serial No. 56,386 filed December 27, 1935.

The principal object of the present invention is to provide clutch means for sifter mechanisms of the character stated wherein the sifting mechanism can be stopped whenever desired, while the dough breaker machine is in operation.

Another important object of the invention is to provide clutch means for flour sifting mechanisms which can be operated conveniently by a single machine attendant.

Still another important object of the invention is to provide clutch means for sifter mechanisms of the character stated wherein the clutch will remain in engaged position when shifted by the attendant without further attention until disengagement is desired.

These and various other important objects and advantages of the invention will become apparent to the reader of the following specification.

In the drawings:

Figure 1 is a top plan view illustrating the application of the clutch mechanism.

Figure 2 is a longitudinal sectional view showing the clutch means.

Figure 3 is a cross sectional view on the line 3—3 of Figure 2.

Figure 4 is an enlarged fragmentary sectional view showing the clutch mechanism.

Figure 5 is a cross sectional view taken substantially on the line 5—5 of Figure 4.

Figure 6 is an elevational view of the clutch actuating arm.

Referring to the drawings wherein like numerals designate like parts, it can be seen that the dough breaker machine with which the clutch mechanism of my invention is concerned, includes upright frame members 6—6 upon which is supported the flour hopper 7, from which the flour is delivered to dough as it passes thereunder to the usual table. As in the conventional machine, this hopper 7 is provided with a cylindrical lower portion 8 for receiving the flour agitating reel 9 which is secured to the shaft 10, this shaft being disposed through the cylindrical portion 8 of the hopper and provided at one end with the extension 11.

The bottom of the hopper 7 as usual, is provided with a longitudinally extending slot 12 filled by the sifting screen 13.

The clutch mechanism whereby the reel 9 can be stopped independently of the drive mechanism of the machine will now be described. This mechanism 14 comprises the casing 15 of cylindrical shape and having an opening therein permitting access to the clutch and other details and closed by the cover plate 16. A bearing 17 is mounted within one end of the casing 15 and the shaft 11 extends therethrough and as is clearly shown in Figure 2. The shaft extension 11 is provided with a thrust collar 18 secured in place by a set screw 19 and interposed between the thrust collar and the bearing 17 is the ball bearing mount 20. Suitable lubricating means 21 is provided for the bearing 17.

Slidably connected with the shaft extension 11 by a key 11' is the circumferentially grooved collar 22 in the groove of which the end portions 23 of the clutch fork 24 engage, said fork forming part of a clutch actuating lever 25 pivotally mounted, as at 27, on ears 26 extending from the cover plate 16.

One end of the arm 25 extends into the casing 15 and has attached thereto the fork 24 while the other end of the arm 25 is provided with a handle 28 extending laterally toward the sifter.

The extending end of the shaft extension 11 is journaled in the spindle 29, this spindle being provided with the reduced extension 30 to which the sprocket wheel 31 is secured for connection to the usual sprocket and chain drive mechanism of the machine, not shown. The outer end of the casing 15 is provided with the header 32 having the tubular extension 33 in which the spindle 29 is journaled.

The inner end of the spindle 29 is provided with a clutch drum 34 and between this drum and the inner end of the tubular extension 33 is the ball bearing mount 35.

Secured by a set screw to the shaft extension 11 is the collar 36 from which extends the radial flange 37. Extending laterally from this flange 37 in circumferentially spaced concentric relation to the extension 11 and the clutch drum 34 are the arcuate-shaped cleats 38—38 against which the split clutch band or shoe 39 is engageable. The ends of this band 39 are provided with inwardly disposed lugs 40—40 tensioned against separation by the split spring ring 41 having its ends bearing against the lugs 40—40 and holding the same against the cam 42 adapted as presently seen for rotation to separate said lugs. This cam 42 is located on the shaft 43 which extends through the flange 37 and on the opposite side of the flange 37 from that shown in Figure 5, the shaft 42 is provided with the arcuate-shaped arm 44, which at its free end is provided with the head 45 having a threaded bore therethrough for receiving the set screw 46. A jamb nut 47 is provided on this screw for cooperation with the head 45 to lock said screw in set position.

The slide collar 22 is provided with a reduced extension 48 against which the screw 46 rides when the clutch is in disengaged position. Between this reduced extension 48 and the smooth cylindrical portion 49 is the beveled shoulder portion 50 over which the screw 46 can easily ride to bear against the portion 49.

It can now be seen, that when the lever 28 is actuated to slide the collar 22 toward the right in Figure 4, that is to apply the clutch, the extension 48 and shoulder 50 will cam the screw 46 outwardly and result in the movement of the screw from the reduced portion 48 to the portion 49. This obviously causes outward movement of the arm 44 (see Figure 6), rotating the shaft 43 and the cam 42 so that the cam acts to separate the lugs 40—40 and expand the clutch band 39 into engagement with the drum 34. As long as the screw 46 rests against the portion 49 of the collar 22, the clutch will be maintained engaged without any manual effort. However, when disengagement of the clutch is desired, a reverse movement of the collar 22 will result in the restoration of the screw 46 against the reduced portion 48 so that the clutch will become disengaged.

This operation of the clutch will permit the attendant to operate the clutch to stop the sifting mechanism, thus leaving considerable quantities of flour which would normally sift down between delivery of the dough in the dough machine.

While the foregoing specification sets forth the invention in specific terms, it is to be understood that numerous changes, in the shape, size and materials may be resorted to without departing from the spirit and scope of the invention as claimed hereinafter.

Having described the invention, what is claimed as new is:

Clutch mechanism for use on one end of a rotatably mounted shaft comprising a cylindrical housing extending over said end of the shaft concentrically thereof, a driven spindle rotatably mounted in the outer end of said housing and on said end of the shaft, whereby said end of the housing is supported on said shaft, a friction drum fast on the inner end of said spindle concentrically of the shaft, a shoe carrier fast on said shaft within said drum and including a pair of arcuate flanges spaced apart circumferentially of said drum, a split ringlike shoe surrounding said flange and having radial ends spaced apart and relatively separable to expand said shoe against said drum, means to tension said shoe against expansion comprising a split ring reactive inwardly and having its opposite ends secured to and bearing against said ends of the shoe, and means to separate said ends of the shoe including a spreader rotatably mounted on said carrier intermediate said ends of the shoe, a spreader rotating lever extending alongside said shaft and movable outwardly thereof, a lever camming sleeve splined on said shaft and endwise movable into a set position to move said lever and retain the same in outwardly moved position, and a lever pivotally mounted on said housing and operatively connected to said sleeve to move the same.

AUGUST H. POHLMEYER.